No. 702,663. Patented June 17, 1902.
R. W. LYLE.
CONDUIT FOR ELECTRIC WIRES OR CABLES.
(Application filed Apr. 10, 1902.)
(No Model.)
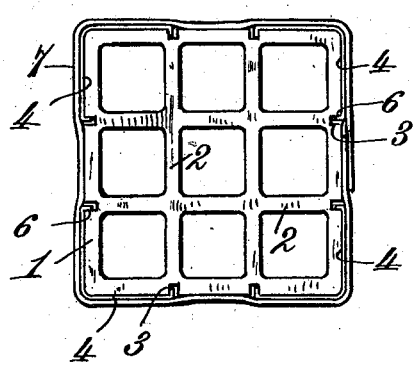
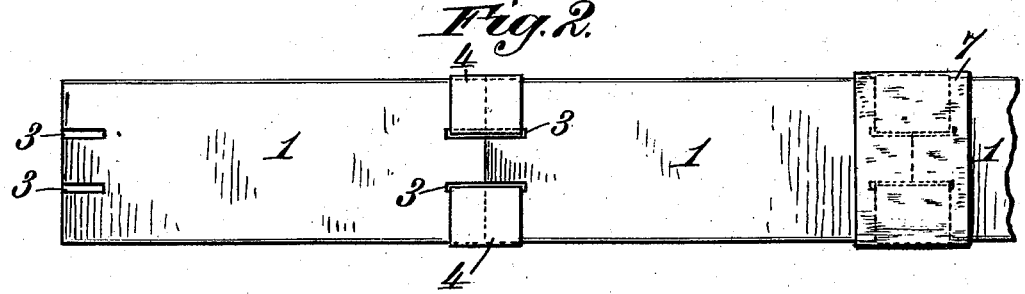
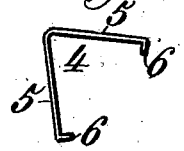
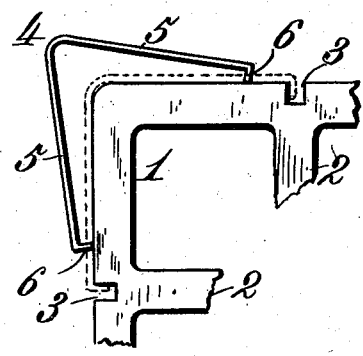
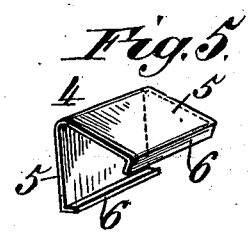
Witnesses.
Inventor.
Robert W. Lyle.

UNITED STATES PATENT OFFICE.

ROBERT W. LYLE, OF PERTH AMBOY, NEW JERSEY.

CONDUIT FOR ELECTRIC WIRES OR CABLES.

SPECIFICATION forming part of Letters Patent No. 702,663, dated June 17, 1902.

Application filed April 10, 1902. Serial No. 102,170. (No model.)

*To all whom it may concern:*

Be it known that I, ROBERT W. LYLE, a citizen of the United States, residing at Perth Amboy, Middlesex county, New Jersey, have invented certain new and useful Improvements in Conduits for Electric Wires or Cables, of which the following is a specification.

My present invention relates to certain new and useful improvements in tiles or conduits for electric wires or cables, and has for its prime object to provide simple, inexpensive, and easily-applied means for locking, connecting, and centering the adjacent ends of the tile or conduit-sections.

In the conduits now in general use it is usual to employ what are termed "centering" dowels or pins, which serve to connect and hold in true alinement the opposite ends of adjacent conduit-sections or tiles, said dowels or pins being constructed and arranged to enter recesses or sockets that are formed in the ends of the webs or partitions of the conduits. These centering dowels or pins are difficult of manipulation and application, and the recesses or sockets, besides being difficult of formation, materially weaken the structure of the conduit-section or tile, particularly the webs or partitions thereof, and are thus objectionable. It is the purpose of the present invention to entirely dispense with the said dowel-pin connections between the adjacent ends of the conduit-sections or tiles and to provide in lieu thereof a simple form of connecting and centering means for the said ends, such means being constructed and arranged to embrace the outer corners or angles of abutting conduit-sections in such manner as to securely lock and hold the sections in true alinement one with the other.

This invention is distinguished from prior devices in the art in that the connecting and centering means are applied to the exterior walls of the conduit-sections or tiles, where they can be readily attached, instead of in the webs or partitions at the ends of the sections, at which points they are almost inaccessible when the sections are being laid.

In order to enable others to understand, make, and use my said invention, I will now proceed to describe the same in detail, reference being had for this purpose to the accompanying drawings, in which—

Figure 1 is an end view of a conduit-section or tile, showing my improved locking and centering means applied thereto. Fig. 2 is a side elevation of a plurality of conduit-sections or tiles centered and locked together. Fig. 3 is an enlarged detail end view of one corner of a conduit-section or tile, showing the locking and centering clip in full lines in position to be applied and in dotted lines the clip is shown in its attached position. Figs. 4 and 5 are detail views of the locking and centering clip.

Referring now to the drawings, the reference-numeral 1 designates the usual form of conduit-section or tile, which is provided with a plurality of vertical and horizontal webs or partitions 2, dividing the tile into a plurality of longitudinal passages, through which the electric wires or cables are passed and within which they are housed and protected. In the exterior faces of the tiles or conduit-sections, at opposite ends thereof, I provide grooves, recesses, or depressions 3, which are preferably located in line with and directly opposite the webs or partitions 2, so as not to unduly weaken the structure of the tile. These grooves extend to the end of the tile, as shown, so that when the tiles are arranged end to end the grooves will register with each other.

The numeral 4 designates a corner-clip, which I have shown in the present instance as made of suitable yielding material, such as spring metal, the arms 5 of which are disposed at an angle to each other. In the type of clip shown when in normal position a cross-section taken therethrough will represent an acute angle. The ends of the arms 5 are bent or flanged inward, as at 6, so as to freely enter the grooves 3 in the tile when the clip is sprung over a corner thereof.

In laying a conduit with my improved tile or conduit-sections and clips said tiles or sections are placed in the trench end to end, so that the grooves in one tile will register or aline with those in the adjacent tile. The spring-clips 4 are then forced over the corners or angles of the tiles at the abutting ends thereof until the flanges 6 snap into the grooves 3. The said tiles will then be securely locked in true alinement one with the other, and as the clips almost entirely cover the joint between the adjacent ends of the abutting tiles said ends will be protected against rupture and a secure closure obtained, thus excluding the entrance of foreign matter into the tiles or conduit-sections, which is a matter of considerable importance in structures of this class. I may, if desired, and preferably do, wrap the abutting ends of the tiles with a strip of asbestos cloth, tarred paper, or the like, 7, as shown in Figs. 1 and 2. This wrapping entirely surrounds the abutting ends of the tiles and covers the spring-clips 4, thus securely holding the latter against accidental displacement and providing a water and moisture proof joint between the parts.

I do not wish to be understood as limiting myself to the precise construction of clip herein shown and described, for it is obvious that changes may be made thereto without departing from the scope of the invention as set out in the claims that follow this specification. I also wish it understood that I do not limit myself to the short grooves 3 at the ends of the tiles, it being obvious that the grooves could be made to extend throughout the entire length thereof and the same result secured.

What I claim, and desire to secure by Letters Patent, is—

1. The combination with a series of tiles arranged end to end, each tile having external grooves at its opposite ends, of clips embracing the outer faces of abutting tiles and having portions thereof entering said grooves to center and lock the tiles in alinement.

2. A conduit comprising a series of tiles arranged end to end, and clips embracing the corners of said tiles at the abutting ends thereof.

3. A conduit comprising a series of tiles arranged end to end, and spring-clips embracing the corners of said tiles at the abutting ends thereof.

4. A conduit comprising a series of tiles arranged end to end, and metallic clips embracing the corners of said tiles at the abutting ends thereof, said clips covering the joints between adjacent tiles.

5. The combination with a series of tiles arranged end to end, each tile having external grooves at its opposite ends, of angular clips embracing the corners of abutting tiles and having portions thereof entering said grooves to center and lock the tiles in alinement.

6. The combination with a series of tiles arranged end to end, each tile having external grooves at its opposite ends, of angular clips embracing the corners of abutting tiles and having flanges that enter said grooves to center and lock the tiles in alinement.

7. The combination with a series of tiles arranged end to end to form a conduit, each tile having external grooves at its opposite ends, of angular clips embracing the corners of abutting tiles and having flanges that enter said grooves, and a covering of flexible material surrounding the abutting ends of the tiles and inclosing said clips.

8. As a new article of manufacture, a corner-clip comprising integral spring-arms normally arranged at an angle to each other less than a right angle, said arms being provided with inwardly-projecting portions.

9. As a new article of manufacture, a corner-clip comprising a strip of spring metal bent intermediate its ends to provide two resilient arms that are normally disposed at an angle to each other less than a right angle, said arms being provided with inwardly-projecting portions.

10. As a new article of manufacture, a corner-clip comprising a strip of resilient material bent intermediate its ends to provide two spring-arms that are normally disposed at an angle to each other less than a right angle, said arms being provided with inwardly-projecting portions.

11. As a new article of manufacture, a corner-clip comprising a strip of spring metal bent intermediate its ends to provide two resilient arms that are normally disposed at an angle to each other less than a right angle, the ends of said arms being flanged inward toward each other.

In testimony whereof I have hereunto set my hand in presence of two subscribing witnesses.

ROBERT W. LYLE.

Witnesses:
 EDGAR W. WILLIAMS,
 ELISABETH WATTERS.